United States Patent [19]

Zabenskie

[11] 4,015,567
[45] Apr. 5, 1977

[54] GASOLINE PREHEATER

[75] Inventor: Gary Zabenskie, Waterloo, Canada

[73] Assignee: Jan Wassing, Kitchener, Canada

[22] Filed: May 12, 1975

[21] Appl. No.: 576,410

[52] U.S. Cl. .................. 123/122 E; 123/133; 123/122 AB
[51] Int. Cl.² ........................... F02M 31/00
[58] Field of Search ........ 123/122 E, 122 AB, 133, 123/34 A; 165/52 R, 169, 51

[56] References Cited

UNITED STATES PATENTS

| 1,168,111 | 1/1916 | Pope | 123/122 E |
| 1,384,512 | 7/1921 | Buchi | 123/122 E |
| 2,158,324 | 5/1939 | Furry | 165/169 |
| 2,611,585 | 9/1952 | Boling | 165/169 |

FOREIGN PATENTS OR APPLICATIONS

| 1,066,524 | 7/1958 | Germany | 165/169 |
| 622,850 | 9/1934 | Germany | 165/169 |

Primary Examiner—Ronald H. Lazarus
Attorney, Agent, or Firm—W. John McClenahan

[57] ABSTRACT

A gasoline preheater for an internal combustion engine, comprising a coil of copper tubing through which gasoline is passed prior to supply to an internal combustion engine for combustion, said tubing coil being in tensioned contact about a copper cylinder through which internal combustion engine coolant is passed and fixed adjacent each tubing coil end to the cylinder, and wherein the cylinder contacting tubing of the tubing coil has a cross-sectional configuration substantially that of a centrally waisted ellipse.

10 Claims, 3 Drawing Figures

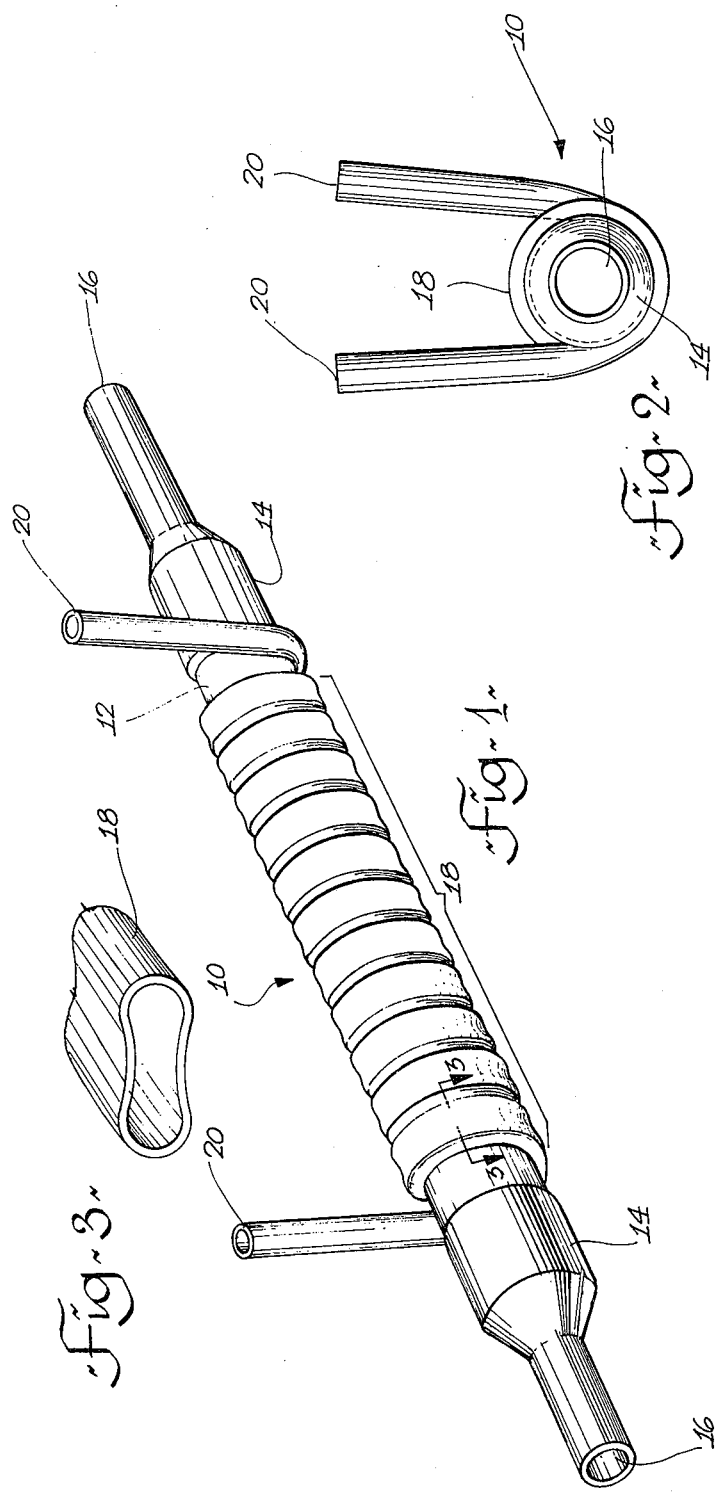

GASOLINE PREHEATER

BACKGROUND OF THE INVENTION

1. Field of the Invention

The invention relates to a gasoline preheater for use with an internal combustion engine. The device provides for heat transfer to gasoline flowing through a particular cross-sectionally shaped copper tubing coil which is in tensioned contact about a copper cylinder through which engine coolant is passed. Gasoline preheating prior to combustion in an internal combustion engine reduces undesirable engine emissions and improves gasoline consumption by formation of an improved air/fuel vapour mixture.

2. Description of the Prior Art

It has long been recognized that preheating of gasoline prior to combustion in an internal combustion engine results in improved engine operation.

Devices previously utilized tended to be of two general types. In the first, the fuel line was wrapped about a source of heat such as the engine manifold or an exhaust pipe. Such structures proved relatively unsuitable because the high manifold or exhaust pipe temperatures attained during engine operation resulted in vapour locks in the fuel line due to excessive fuel heating. In the second, the fuel line was passed through a structure, generally a form of cannister containing engine coolant. This type of structure is superior in operation to that previously described because of the more moderate operating temperatures, but is of necessity relatively large in order to permit mounting of a sufficient length of fuel line within the cannister to obtain satisfactory heat transfer, thus making more difficult the task of installing the device in association with an internal combustion engine. Additionally, disposition of the fuel line within the cannister tends to disrupt normal coolant flow.

SUMMARY OF THE INVENTION

The present invention provides a gasoline preheater for an internal combustion engine, comprising a coil of copper tubing through which gasoline is passed prior to supply to an internal combustion engine for combustion, said tubing coil being in tensioned contact about a copper cylinder through which internal combustion engine coolant is passed and fixed adjacent each tubing coil end to the cylinder, and wherein the cylinder contacting tubing of the tubing coil has a cross-sectional configuration substantially that of a centrally waisted ellipse.

The device is installed for use in an internal combustion engine by incorporation of the cylinder portion into an engine coolant line, preferably the car heater return line, and incorporation of the tubing coil into the fuel line. Optimum performance is achieved when fuel line length from coil to engine carburetor is short, preferably less than about 10 inches.

The device is compact, simple to both manufacture and install, and efficiently preheats gasoline, under normal engine operating temperatures, without vapour lock problems.

BRIEF DESCRIPTION OF THE DRAWINGS

In drawings which illustrate the present invention:

FIG. 1 is a perspective view of the novel gasoline preheater structure;

FIG. 2 is an end elevation of the structure of FIG. 1; and

FIG. 3 is an enlarged, broken away view of a portion of coil tubing in section taken along the line 3—3 of FIG. 1.

DESCRIPTION OF THE PREFERRED EMBODIMENTS

FIG. 1 shows a gasoline preheater 10 having a copper cylinder 12, which includes reducing adaptors 14 fixed to each end of the cylinder and in turn having inlet/outlet ends 16, about which is a copper tubing coil 18 which includes inlet/outlet ends 20.

Reducing adaptors 14 are fixed to cylinder 12 by soldering. Coil 18 is also fixed to cylinder 12 by soldering, preferably adjacent the coil ends, following tensioning, or spring loading, by compressive rotation of the coil. This tensioning ensures adequate surface contact between cylinder 12 and the facing surfaces of coil 18.

The preheater is installed in association with an internal combustion engine by cutting out a section of engine coolant hose, preferably in the car heater return line, inserting the device by coupling the respective hose ends over adaptor ends 16, and by cutting out a section of fuel line and coupling the respective fuel line ends with coil ends 20.

As can best be seen in FIG. 3, the heat exchange tubing has a particular cross-sectional configuration which may be described as substantially that of a centrally waisted ellipse. In geometrical terms the coil cross-section could be described as akin to the ovals of Cassini, wherein $b>a$, as depicted on page 1024 of The Random House Dictionary of the English Language (Random House, Inc., New York, 1966).

The tubing coil is preformed by rolling cylindrical copper tubing onto a rotating mandrell with concomittant backwards torque being applied. The particular cross-sectional configuration of the coil tubing is a specific result of the described preforming process.

The outer diameter of copper cylinder 12 may vary between about ½ to 1 inch depending upon the ultimate application. Tubing of approximately ⅞ inch outer diameter is most commonly used for domestic and foreign automobiles. When using ⅞ inch outer diameter tubing, adaptors 14 are normally reduced to ⅝ inch outer diameter, which figure is a realtively common hose size for car heater lines.

The outer diameter of the cylindrical copper tubing which is preformed to produce the coil may also vary. Although ⅜ and 3/8 inch outer diameter tubing are conventional, it is desirable to match the tubing size with that of the fuel line of the vehicle to be equipped with the preheater.

In a particularly preferred embodiment, which is suitable for use with most foreign and domestic automobiles, cylinder 12 has a length of approximately 7 inches and an outer diameter of ⅞ inch, adaptors 14 reduce to ⅝ inch outer diameter, and the coil is preformed by rolling between about 36 inch to about 40 inch of ⅜ inch outer diameter cylindrical copper tubing onto a ⅞ inch mandrell which is rotating at 80 RPM while concomittantly applying a backwards torque force of approximately 25 foot pounds.

In operation, at normal engine operating temperatures, heat from engine coolant flowing through cylinder 12 is transferred through the cylinder wall, through the walls of tubing coil 18 and imparted to the gasoline flowing through coil 18. The preheater is particularly useful when fuel is preheated to approximately 165°–180° F. since it allows for carburetor adjustment to supply an air/fuel vapour mixture having an air/fuel ratio of up to about 22:1, as opposed to the conventional air/fuel ratio which is about 15:1. Improved engine emission and fuel consumption characteristics are realized by the higher air/fuel ratios permitted by use of the preheater.

It appears that there is a sufficient pressure developed within the tubing coil 18 to prevent boiling of the gasoline being heated (b.p. ≈ 176° F), thus eliminating vapour locks within the preheater.

While to an extent the temperature attained by the gasoline upon preheating is dependent upon ambient temperatures, the temperature of preheated gasoline entering the carburetor is very much dependent upon the length of fuel line between the heat transfer coil and the carburetor. In practice it has been found that a distance of about 10 inches or less is preferable.

It can prove desirable to maintain a relatively constant coolant temperature in the coolant line, in which case a modulating thermal control device can be mounted in the line, normally upstream in the hose line so as not to effect either engine temperature or can heater input temperature, assuming that the preheater is installed in the car heater coolant return line.

It should be understood that tubing, cylinder or adaptor dimensions can be varied to suit a particular application. Similarly, preforming of the tubing coil can be satisfactorily accomplished at different mandrell rotation speeds, with different mandrell dimensions and with various backwards torque forces to those specifically disclosed.

It is also apparent that the tubing coil produced by the described preforming process, i.e. having the characteristic centrally waisted elliptical cross-section, may be useful in a number of heat exchange applications in addition to its use in the gasoline preheater of the present invention.

The embodiments of the invention which have been described and illustrated are not be be construed as limiting since it is obvious that many modifications and alterations may be made without departing from the true broad mixture scope.

What is claimed is:

1. A gasoline pre-heater in combination with a liquid-cooled internal combustion engine, the pre-heater comprising a coil of copper tubing through which gasoline is passed prior to supply to the internal combustion engine for combustion, said tubing coil being in tensioned contact about a copper cylinder through which internal combustion engine coolant is passed and fixed adjacent each tubing coil end to the cylinder, and wherein the cylinder contacting tubing of the tubing coil has a cross-sectional configuration substantially that of a centrally waisted ellipse.

2. A combination according to claim 1, wherein the cylinder includes a copper reducing adaptor fixed onto each of its two ends.

3. A combination according to claim 2, wherein the cylinder has an outer diameter between about ½ to 1 inch.

4. A combination according to claim 3, wherein the tubing coil is preformed by rolling cylindrical copper tubing onto a rotating mandrell with concomittant backwards torque being applied.

5. A combination according to claim 3, wherein the cylinder has an outer diameter of about ⅞ inch.

6. A combination according to claim 5, wherein the tubing coil is preformed by rolling cylindrical copper tubing onto a rotating ⅞ inch mandrell with concomittant backwards torque being applied.

7. A combination according to claim 6, wherein the cylindrical copper tubing has an outer diameter of about 5/16 inch, a length between about 36–40 inches, wherein the mandrell is rotated at approximately 80 RPM and wherein the backwards torque force is approximately 25 foot pounds.

8. A combination according to claim 7, wherein the tubing coil is fixed to the cylinder adjacent each tubing coil end by solder.

9. A gasoline pre-heater in combination with a liquid-cooled internal combustion engine, the pre-heater comprising a coil of copper tubing through which gasoline is passed prior to supply to the internal combustion engine for combustion, said tubing coil being in tensioned contact about a copper cylinder through which internal combustion engine coolant is passed and soldered adjacent each tubing coil end to the cylinder, said copper cylinder including a copper reducing adapter soldered onto each of its two ends, wherein the cylinder contacting tubing of the tubing coil has a cross-sectional configuration substantially that of a centrally waisted ellipse, and wherein the tubing coil is pre-formed by rolling cylindrical copper tubing onto a rotating mandrel with concomitant backwards torque being applied.

10. A combination according to claim 9, wherein the cylinder has an outer diameter of about ⅞ inch and the tubing coil is preformed by rolling cylindrical copper tubing having an outer diameter of about 5/16 inch and a length of about 35–40 inches onto a ⅞ inch mandrell rotating at approximately 80 RPM while concomittantly applying to the tubing a backwards torque force of approximately 25 foot pounds.

* * * * *